United States Patent [19]
Shibuya et al.

[11] Patent Number: 5,880,874
[45] Date of Patent: Mar. 9, 1999

[54] OPTICAL EQUALIZER AND OPTICAL AMPLIFIER AND WAVELENGTH MULTIPLE OPTICAL TRANSMISSION APPARATUS USING OPTICAL EQUALIZER

[75] Inventors: Takashi Shibuya; Takefumi Oguma, both of Tokyo, Japan

[73] Assignee: NEC Corporation, Tokyo, Japan

[21] Appl. No.: 844,674

[22] Filed: Apr. 21, 1997

[30] Foreign Application Priority Data

Apr. 23, 1996 [JP] Japan ................................ 8-100910

[51] Int. Cl.$^6$ ........................................................ H01S 3/00
[52] U.S. Cl. ........................ 359/337; 359/341; 359/134
[58] Field of Search ................................. 359/124, 134, 359/160, 341, 337

[56] References Cited

U.S. PATENT DOCUMENTS

| | | | |
|---|---|---|---|
| 5,436,760 | 7/1995 | Nakabayashi | 359/341 |
| 5,566,018 | 10/1996 | Lee et al. | 359/341 |
| 5,583,689 | 12/1996 | Cassidy et al. | 359/341 |

FOREIGN PATENT DOCUMENTS

| | | |
|---|---|---|
| 344206 | 2/1991 | Japan . |
| 3-196125 | 8/1991 | Japan . |
| 4147114 | 5/1992 | Japan . |
| 4-233519 | 8/1992 | Japan . |
| 6-069891 | 3/1994 | Japan . |
| 6-276154 | 9/1994 | Japan . |
| 6276154 | 9/1994 | Japan . |
| 6302895 | 10/1994 | Japan . |

*Primary Examiner*—Mark Hellner
*Attorney, Agent, or Firm*—Whitham, Curtis & Whitham

[57] ABSTRACT

There are provided a plurality of etalon filters arranged in concatenation, a light output portion for outputting a light to the etalon filters, and a light input portion to which a light transmitting the etalon filters is inputted, and the plurality of etalon filters have mutually different free spectrum regions. A plurality of etalon plates applied with semipermeable films to both surfaces of a thin glass plate and having mutually different periods and amplitudes are cascade-connected. By combining a plurality of etalon films having different characteristics with one another, it is possible to realize an optical equalizer having low loss polarized light dependency and capable of compensating optional gain wavelength dependency. By using such an optical equalizer as a repeater by combining the optical equalizer with an optical amplifier, a level difference caused by the difference of the gain among wavelengths of optical signals is neither produced in a wavelength multiple optical transmission apparatus. It is possible to realize an optical equalizer for compensating gain wavelength dependency of an optical fiber amplifier, which compensates for optional gain wavelength dependency and has low loss polarized light dependency.

45 Claims, 7 Drawing Sheets

Fig.12

OPTICAL EQUALIZER AND OPTICAL AMPLIFIER AND WAVELENGTH MULTIPLE OPTICAL TRANSMISSION APPARATUS USING OPTICAL EQUALIZER

BACKGROUND OF THE INVENTION

1. Field of the Invention

The present invention relates to an optical equalizer and an optical amplifier and a wavelength multiple optical transmission apparatus using the optical equalizer, and more particularly to an optical equalizer for flattening gain wavelength dependence characteristics of an optical amplifier and an optical amplifier to which the optical equalizer is applied.

2. Description of Related Art

There is an optical wavelength multiple transmission system as one of the techniques for realizing a large capacity of an optical communication system. This is a system that transmission is made after a plurality of optical signals having mutually different wavelengths are multiplexed on one line of optical fiber.

On the other hand, an optical fiber amplifier using a rare earth element doped optical fiber as an amplification medium which has been realized rapidly in recent years can amplify the signals having different wavelengths collectively. When this optical fiber amplifier is applied to an optical wavelength multiple transmission system, a large capacity long distance transmission system can be realized.

Now, the gain is generally different depending on the wavelength of an optical signal with respect to either an optical fiber amplifier and an optical semiconductor amplifier. Accordingly, when a plurality of wavelength multiplexed signal lights are amplified collectively, the optical output level of the optical amplifier is different depending on the wavelength. Moreover, when optical amplifiers are connected on multistages, the level difference of the optical output is accumulated.

When reception is made after wavelength branching on a receiver side, problems of stroke deterioration among respective wavelengths and in point of setting a light receiving level of a receiver are produced since the optical output level is different depending on the wavelength. Thus, an optical equalizer for compensating gain wavelength dependency of an optical amplifier becomes necessary.

There has been heretofore a method of inserting an equalizing optical filter for flattening the gain wavelength dependency into an optical fiber amplifier as one of the methods for compensating the gain wavelength dependency of an optical fiber amplifier. Such a technique is described in Japanese Patent Application No. Hei 01-177985 for instance. Further, as another method, there is a method of providing an optical fiber coupler such as described in Japanese Patent Application No. Hei 05-109975.

Further, as one of equalizing optical filters, a grating type (such as M. Tachibana, R. I. Laming, P. R. Morkel and D. N. Payne "Gain-shaped Erbium-doped fibre amplifier with broad spectral bandwidth", Technical Digest on Optical Amplifiers and their Applications, pp. 44–47, 1990) and a Mach-Zehnder type (such as disclosed in Japanese Patent Application No. Hei 2-270766) are proposed.

Furthermore, as an improved type of a Mach-Zehnder type optical equalizer, that in which Mach-Zehnder type optical filters having mutually different variation periods of loss depending on wavelength of wave-length dependency of transmittance are cascade-connected on multistages has been proposed (such as disclosed in Japanese Patent Application No. Hei 5-60047).

The above-mentioned conventional examples have drawbacks shown hereunder, respectively.

Namely, an optical fiber coupler is produced by fusing and stretching two lines of optical fibers, in which evanescent coupling among optical fibers is utilized. In this sort of coupler, when a variation period of wavelength dependency of the loss is shortened, it is required in point of principle to produce a fusion coupling portion long, and the manufacturing reproducibility of loss wavelength characteristics is lowered with the length of the fusion coupling portion.

In a band of wavelength 1,550 nm used in an optical fiber amplifier at present, when the gain to wavelength characteristics of an optical fiber amplifier is going to be compensated, it is required to shorten the period of a loss to wavelength characteristic curve of an optical fiber coupler to approximately 100 nm or lower, and it is attended with technical difficulties to manufacture such characteristics stably.

Generally, when the gain to wavelength characteristics of an optical amplifier is going to be compensated with an optical filter, the transmission wavelength characteristics of an optical filter have to be made double-humped in many cases. When characteritics of transmission wavelength including such a plurality of peaks are obtained, it becomes required to produce a wavelength interval between two transmission peaks and transmittance strictly with high reproducibility. In an example in which an interference filter by a multilayer dielectric film is used, it is very difficult to produce such double-humped transmission characteristics strictly and stably.

Further, in an example in which a grating (a fiber type grating or a grating provided on a glass substrate) is used, the wavelength dependency of the loss has a steep peak at a specific wavelength and has a large lag from the gain wavelength curve of the opticalamplifier. Therefore, when it is used for compensation of the gain wavelength dependency, there is such a drawback that a compensation error becomes larger in point of principle.

There is a Mach-Zehnder type optical filter as another conventional example. In this filter, a Mach-Zehnder type waveguide is formed on a quartz waveguide substrate, and a thermal optical effect is used for respective phase adjustments. In this Mach-Zehnder type optical filter, a refractive index change by the thermal optical effect is generated by adjusting the voltage applied to an electrode, thereby to change the phase so as to adjust the transmittance wavelength dependency in a wavelength direction. The Mach-Zehnder type optical filter is described in detail in Japanese Patent Application No. Hei 5-60047 for instance.

In the case of a Mach-Zehnder type optical filter, however, phase adjustment of a transmission light is made by generation of heat in an electrode provided on a waveguide. Therefore, there is such a drawback that a distortion inside the waveguide is liable to be generated, which generates polarization dependency of insertion loss.

SUMMARY OF THE INVENTION

It is an object of the present invention to realize an optical equalizer having less compensation error of gain wavelength dependency of an optical amplifier and small polarized light dependency of transmittance which can be manufactured stably in view of various problems of the above-mentioned conventional example.

An optical equalizer of the present invention comprises a plurality of etalon filters arranged in concatenation, a light output portion for outputting a light to these etalon filters and a light input portion to which the light transmitting through the etalon filters is inputted, wherein the plurality of etalon filters have free spectral range that are mutually different.

Further, in the etalon filter, a reflecting substrate in which reflecting films for reflecting a part of the light are formed on both surfaces of a substrate of glass or the like transmitting the light and a block such as glass having a coefficient of linear expansion close to or the same as that of the above-mentioned substrate are fixed. Further, on one surface of the glass block, a dielectric multilayer film having optical characteristics equivalent to that of the etalon filter formed by vapor deposition or sputtering in place of the reflecting substrate is formed. Here, the substrate or the dielectric multilayer film has a plate thickness or a film thickness in which the difference in loss of a plurality of optical signals transmitting the etalon filter shows a predetermined specific value.

On the other hand, the optical amplifier of the present invention, in which an optical equalizer having the above-mentioned features basically is applied, is provided with an optical amplifier for amplifying an inputted optical signal and outputting an amplified optical signal, and the optical equalizer. Here, the optical equalizer is arranged in the latter part or in the foregoing part of the optical amplifier. Further, it is also possible to use two optical amplifiers and arrange an optical equalizer therebetween.

The optical amplifier can be applied when the optical amplifier is whether an optical fiber amplifier or an optical semiconductor amplifier.

Furthermore, in a wavelength multiple optical transmission apparatus of the present invention, an optical amplifier having the above-mentioned features is used as a repeater. The wavelength multiple optical transmission apparatus of the present invention is composed of an optical transmission apparatus including an optical transmitter for sending optical signals having a plurality of mutually different wavelengths and an optical coupler for multiplexing a plurality of optical signals and outputting a multiplexed optical signal at one end of an optical transmission path, and an optical reception apparatus including an optical branching filter for branching a multiplexed optical signal outputted from another end of the optical transmission path for every wavelength and sending out a branched optical signal and an optical receiver connected to the optical branching filter and converting the branched optical signals into electric signals, respectively. At least one optical amplification repeater device for amplifying a multiplexed optical signal inputted from the optical transmission path and outputting the optical signal to the optical transmission path is arranged between the optical transmission apparatus and the optical reception apparatus.

In such a structure, the optical amplification repeater device has an optical amplifier for amplifying an inputted optical signal and outputting the amplified optical signal, a plurality of etalon filters arranged in concatenation, a light output portion for outputting a light to these etalon filters and a light input portion to which the light transmitting through the etalon filter is inputted, in which the plurality of etalon filters are provided with optical equalizers having mutually different free spectrum regions.

Here, the optical equalizer is arranged in the latter part or in the foregoing part of the optical amplifier. The optical equalizer is applicable whether the optical amplifier is an optical fiber amplifier or an optical semiconductor amplifier.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

First of all, a basic principle of an optical equalizer having the above-described features will be explained.

In an optical equalizer of the present invention, at least two or more etalon filters having mutually different free spectrum regions (hereinafter referred to as "FSR"s) are arranged in concatenation between optical paths of two optical fiber collimators arranged with optical axes in accord with each other.

In the etalon filter, the principle of interference by repeated reflection between two semipermeable films arranged in parallel with each other is applied. When semipermeable films having reflectances (reflectance of amplitude) r1 and r2 are applied to both surfaces of a medium having a refractive index n placed in the air, the transmittance (T) of interference by repeated reflection between these semipermeable films is expressed approximately by:

$$T = 1 - 2 \cdot r1 \cdot r2 (1 - \cos \delta) \qquad (1)$$

Here, $$\delta = 4\pi n d \cdot \cos\theta/\lambda_0 \{1-(\lambda-\lambda_0)/\lambda_0\} \quad (2)$$

λ: wavelength of light
$\lambda_0$: wavelength when transmittance shows a maximal value (=wavelength satisfying 2nd cos θ)
θ: incident angle of beam into etalon filter
d: spacing of semipermeable films On the other hand, the gain curve of an optical amplifier for a signal light wavelength can be expanded into Fourier series for the wavelength. Therefore, when filters having sinusoidal wave form loss characteristics of the same amplitude and period as the Fourier expansion terms of the gain curve are combined, it is possible to flatten the gain curve of the optical amplifier completely.

Since the etalon filter having sinusoidal wave form loss wavelength characteristics shown with the expression (1) is used in an optical equalizer of the present invention, it is possible to completely compensate and flatten the gain to wavelength curve of an optical amplifier in point of principle.

Figure 1:
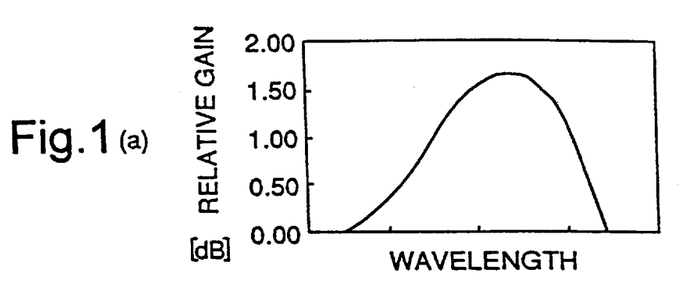
FIG. 1 shows diagrams for explaining a principle of compensation operation of gain wavelength dependency of an optical equalizer of the present invention, in which (*a*) is a curve (a gain wavelength curve) showing an example of wavelength dependency of the gain of an optical fiber amplifier, (*b*) is a curve showing loss wavelength characteristics obtained by superposition of Fourier expansion terms of the gain wavelength curve shown in (*a*), and (*c*) and (*d*) are curves showing loss wavelength characteristics of an etalon filter used for compensating the gain.

The principle of flattening the gain among wavelengths in case the above-mentioned optical equalizer of the present invention is applied to an optical amplifier will be described in further detail with reference to the drawings. FIG. 1 shows a principle explanatory diagrams for explaining gain wavelength dependency compensating operation of an optical equalizer.

FIG. 1(a) is a curve (a gain wavelength curve) showing an example of wavelength dependency of the gain of an optical fiber amplifier. Such wavelength dependency of the gain can also be flattened by means of the etalon filter. Namely, the gain wavelength curve shown in FIG. 1(a) of the present invention is expanded up to secondary Fourier expansion terms, and a plurality of etalon filters each having the same amplitude and period as these Fourier expansion terms are used.

For example, the etalon filter having loss wavelength characteristics such as shown in FIG. 1(c) and (d) is used for the above-mentioned gain wavelength curve. The amplitude and the period of the loss wavelength characteristics are obtainable by setting the light path length and the reflectance of the etalon filter appropriately as described above. When these two etalon filters are combined with each other, an optical equalizer having loss wavelength characteristics shown in FIG. 1(b) can be obtained.

The loss wavelength characteristics shown in FIG. 1(b) show an essentially equivalent curve as that shown in FIG. 1(a) since the loss wavelength characteristics are the superposition of Fourier expansion terms of the gain wavelength curve. Accordingly, when an optical equalizer having loss wavelength characteristics shown in FIG. 1(b) is used, it is possible to flatten the gain wavelength curve shown in FIG. 1(a).

Besides, since it is possible to adjust transmission wavelength characteristics depending on an incident angle of a light, the above-mentioned etalon filter has such an advantage that the loss wavelength characteristics can be controlled finely at the time of manufacturing the optical equalizer. Furthermore, there is also such an advantage that the polarized light dependency of the loss of the etalon filter can be canceled simply by bringing the incident angle of the light near zero.

Next, embodiments of an optical equalizer of the present invention will be described in detail with reference to the drawings.

Figure 2:
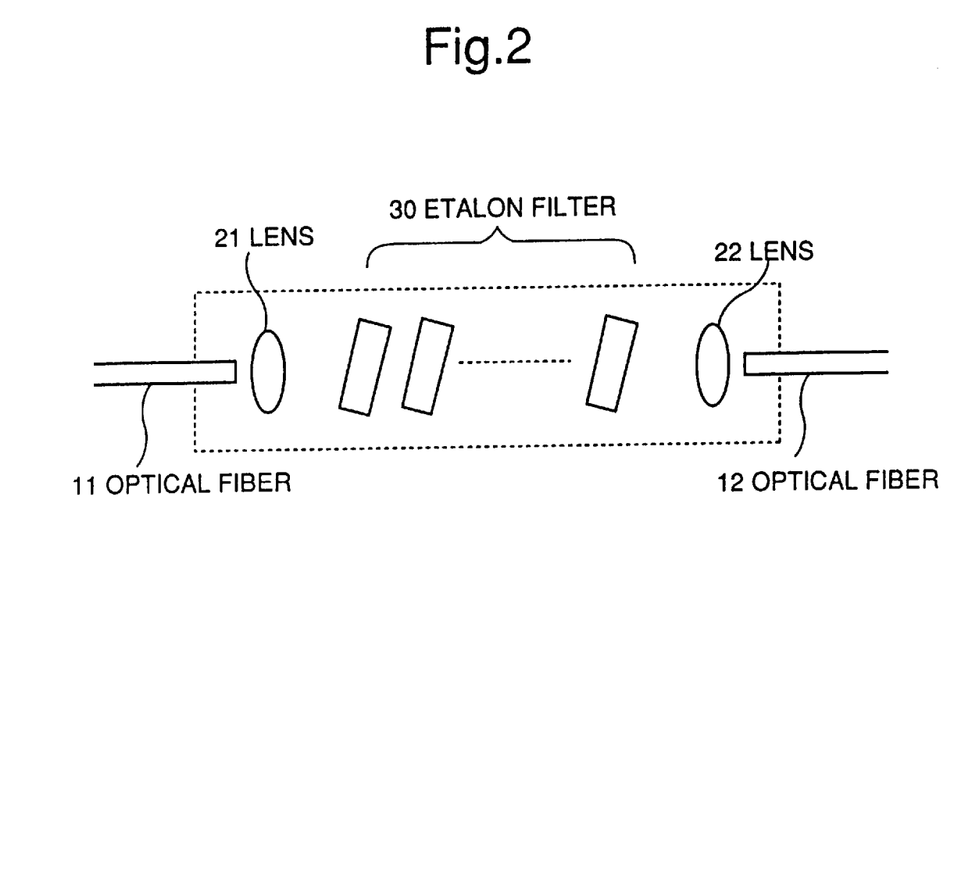
FIG. 2 is a diagram showing a basic structure of an optical equalizer of the present invention.

FIG. 2 is a diagram showing a structure of an embodiment of an optical equalizer of the present invention.

Optical fibers 11 and 12 are coupled optically with a collimation beam by means of lenses 21 and 22. N pieces of etalon filters 30 having mutually different FSRs are inserted between the lenses 21 and 22. The maximum value of loss, the minimum value of loss and the FSR of the Nth etalon filter are set by Fourier series expansion of gain wavelength characteristics of an optical amplifier to which an optical equalizer of the present invention is applied.

First, the etalon filter constituting an optical equalizer of the present invention will be described.

Figure 3:
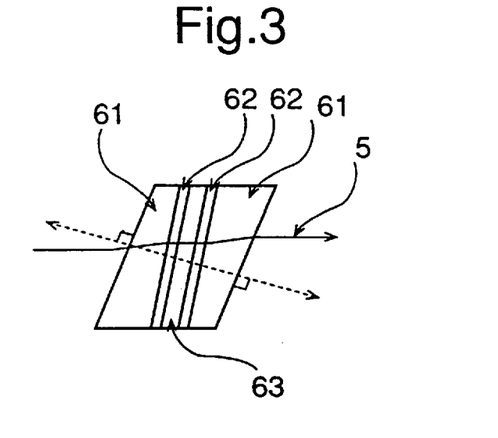
FIG. 3 is a diagram showing a structure of an etalon filter used in an optical equalizer of the present invention.
Figure 4:
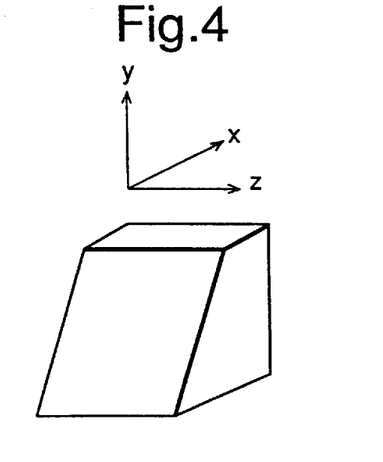
FIG. 4 is a perspective view showing a structure of a substrate used in the etalon filter shown in FIG. 3.
Figure 5:
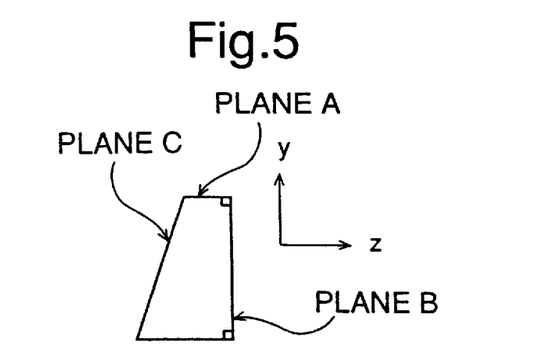
FIG. 5 is a longitudinal sectional view of the substrate shown in FIG. 4.

FIG. 3 is a diagram showing an example of a structure of an etalon filter used in an optical equalizer of the present invention, FIG. 4 is a perspective view showing a structure of a substrate used in the etalon filter shown in FIG. 3, and FIG. 5 is a longitudinal sectional view of the substrate shown in FIG. 4.

The etalon filter can be designed by applying the above-mentioned theory. In assembling an actual optical equalizer, however, the etalon filter has such a problem that the plate thickness is normally very thin, thus making it difficult to handle the same. In the present embodiment, a structure capable of solving these problems in practical manufacturing will be described.

In the etalon filter used in one embodiment of an optical equalizer of the present invention, handling is made easier by increasing the plate thickness of the etalon filter without marring optical characteristics thereof and the strength is secured at the same time. Transformation caused by thermal stress of an etalon element generated by the difference in the coefficients of linear expansion between the etalon element and a supporting and fixing portion thereof and deterioration of optical characteristics attendant thereto are also controlled.

As shown in FIG. 3, the etalon filter has a structure that an etalon element 63 is held in a thickness direction by means of blocks 61 each having a coefficient of linear expansion equivalent to or close to that of the etalon element 63 and sufficiently high strength. A plane B of the block 61 (see FIG. 5) and both optical planes of the etalon element 63 are fixed by adhesion with optical adhesives 62.

As shown in FIGS. 4 and 5, the block 61 is obtained by grinding one plane of dielectric parallel plates (such as quartz glass) having the coefficient of linear expansion the same as or close to that of the etalon element 63 in one direction so as to form a wedge shape. When an axis which meets at right angles with an optical axis 5 (parallel with the axis x in the figure) and is perpendicular to a plane A in the figure is referred to as the axis y and an axis which meets at right angles with axes x and y is referred to as an axis z, a wedge work surface (hereinafter referred to as an inclined surface) of the block is inclined only in the direction of the axis y in the figure. Therefore, when the block is cut along an optional plane parallel to an x-y plane, the sectional configurations show the same trapezoid. Further, when the block is cut along an optional plane parallel to an x-z plane, the sectional configuration shows a rectangle. Two same blocks 61 fixed to both planes of the etalon element 63 shown in FIG. 3 are arranged so that normal vectors of the inclined surface are parallel to each other as shown in FIG. 3.

Figure 6:
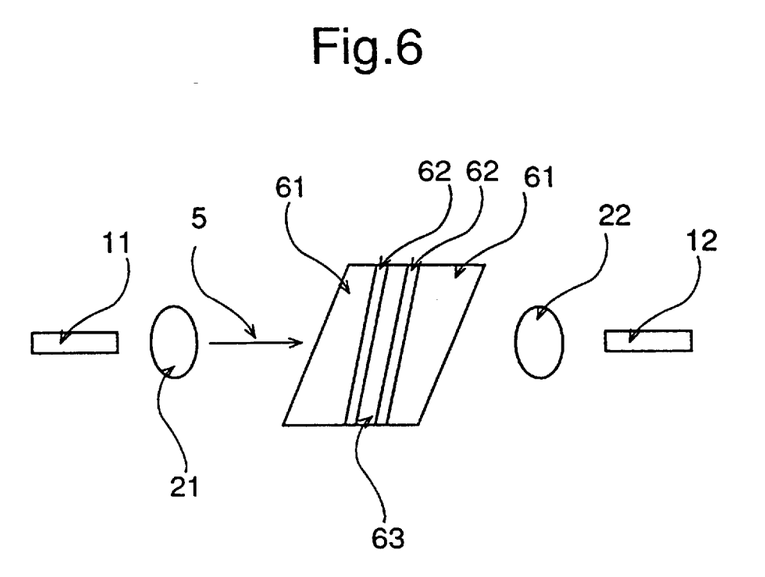
FIG. 6 is a diagram showing an embodiment of an optical equalizer of the present invention using the etalon filter shown in FIG. 3.

Next, the principle of the optical equalizer of the present invention will be described. FIG. 6 shows an embodiment of an optical equalizer of the present invention using the etalon filter shown in FIG. 3.

Optical fibers 11 and 12 are coupled optically by lenses 21 and 22. A collimation beam is formed between the lenses 21 and 22, and at least one filter 6 is inserted in the optical path. In the filter 6, two wedge-shaped blocks 61 and the etalon element 63 are fixed to one another with optical adhesives.

The collimation beam 5 transmits through the block after being incident upon the block 61 and transmits through the optical adhesives 62. Thereafter, the beam 5 is Fabry-P,rot resonated in the etalon element 63, thus selecting the wavelength. The light with the wavelength selected transmits the optical adhesives 62 on the right side in the figure, transmits to the block 61 thereafter, and is emitted into the air and is coupled with the fiber 12 on the emission side through the lens 22.

In the present embodiment, since normal vectors (shown with dotted lines in FIG. 3) of inclined surfaces of two blocks arranged on both sides of the etalon element are parallel to each other, arcuation of the light is not generated before and after passing through the filter 6, and no excessive loss is generated. This is apparent from Snell's law. Since the ray incident and emission planes of the block 61 (planes B and C in FIG. 4) are not parallel to each other, Fabry-P,rot resonance inside the block is not generated, but deterioration of optical characteristics is not produced.

Because of two reasons described above, it becomes possible to increase the etalon filter plate thickness without deteriorating the optical characteristics of the etalon element by using the embodiment of the present invention, and the strength is also secured. By selecting a material having a coefficient of linear expansion close to that of an etalon element for the material quality of the block, generation of thermal stress is oppressed, and optical characteristic variation due to an environmental temperature change can also be controlled, which is another object of the present invention.

Figure 7:
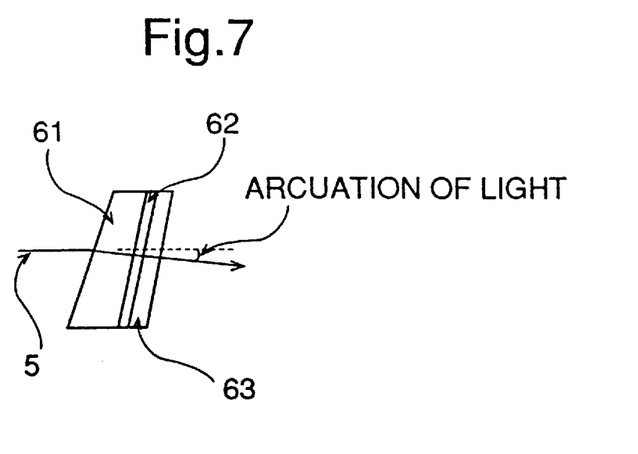
FIG. 7 is a diagram showing a structure of a second embodiment of an etalon filter used in an optical equalizer of the present invention.

Next, another embodiment of an etalon filter used in an optical equalizer of the present invention will be described. FIG. 7 shows a structure of a second embodiment of an etalon filter used in an optical equalizer of the present invention. In the present embodiment, the block 61 is arranged only on one side of the etalon element. In this case, since a transmitting ray is refracted by Snell's law when the ray transmits the inclined surface of the block, an arcuation of ray is generated before and after transmitting the filter as shown in the figure. However, by setting the tilt angle of the inclined surface to approximately 2 degrees or less and performing optimum optical axis adjustment with respect to the lens 22 and the fiber 12 on the emission side, it is possible to oppress loss increase due to the arcuation of the ray to a negligible level (0.1 dB or less), and to increase effective plate thickness without deterioration of optical characteristics of the etalon element.

Figure 8:
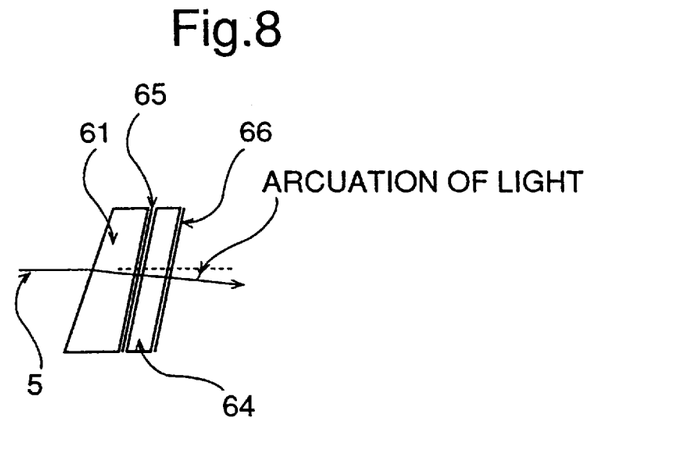
FIG. 8 is a diagram showing a third embodiment of a structure of an etalon filter used in an optical equalizer of the present invention.

FIG. 8 shows a structure of a third embodiment of an etalon filter used in an optical equalizer of the present invention. In the structure of the present embodiment, a film construction (high reflection films 65 and 66 and a Fabry-P,rot resonance portion 64) having the same characteristics as those of an etalon element is formed on the block 61 by deposition, sputtering or the like, and is made to function as an etalon filter. When the etalon element is formed directly on the block, it is apparent that the present embodiment is effective in a point that the plate thickness of the etalon filter is increased without characteristic fluctuation of the etalon element.

Figure 9:
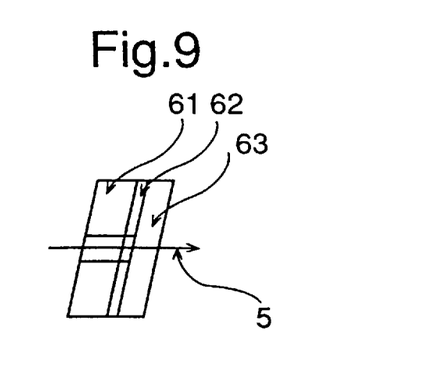
FIG. 9 is a diagram showing a fourth embodiment of a structure of an etalon filter used in an optical equalizer of the present invention.

FIG. 9 shows a structure of a fourth embodiment of an etalon filter used in an optical equalizer of the present invention. In the structure of the present embodiment, dielectric parallel plates are used for the block 61, and a donut-shaped ray transmitting portion is formed. In this structure, since a medium (a block or adhesives) other than the etalon element is not in existence in the ray transmitting portion, deterioration of optical characteristics of the etalon element is not generated. Further, since other portion than the ray transmitting portion of the etalon element is fixed to the block with adhesives, increase of effective plate thickness is also realized. As a matter of course, the point that characteristic fluctuation on environmental change can be oppressed by selecting the material quality of the block is similar to the above-mentioned two embodiments.

As an etalon filter, a structure that an etalon element is held in a thickness direction by means of blocks having a coefficient of linear expansion equivalent to or close to that of the element and sufficiently high strength is adopted. With this, the generation of thermal stress is oppressed, and optical characteristic fluctuation caused by environmental temperature change can be controlled.

Next, a structure of an optical amplifier using an optical equalizer of the present invention will be described.

Figure 10:
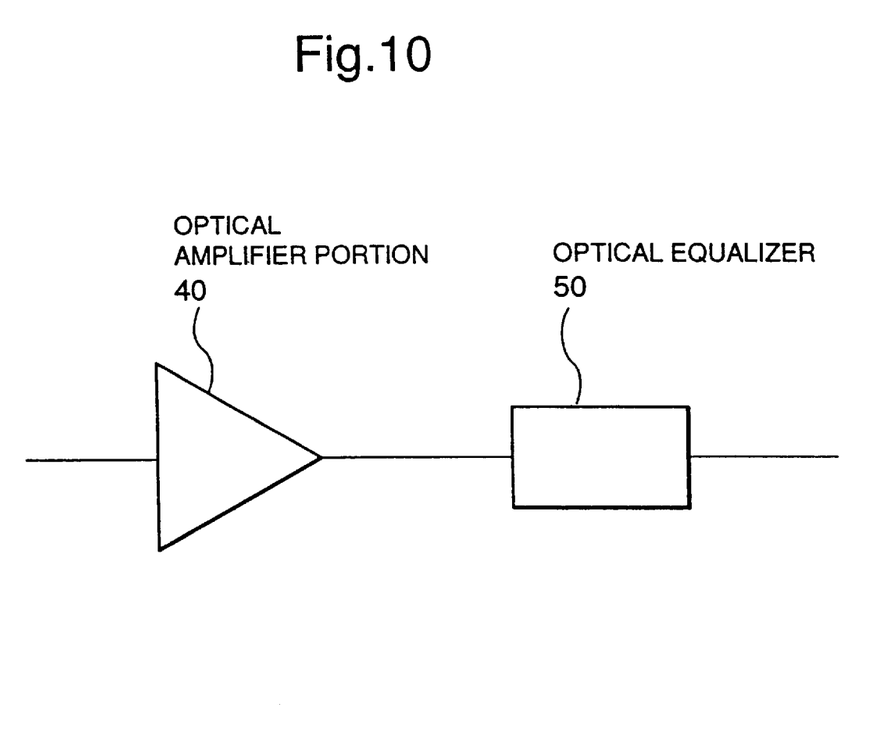
FIG. 10 is a diagram showing a structure of a first embodiment of an optical amplifier applied with an optical equalizer of the present invention.
Figure 11:
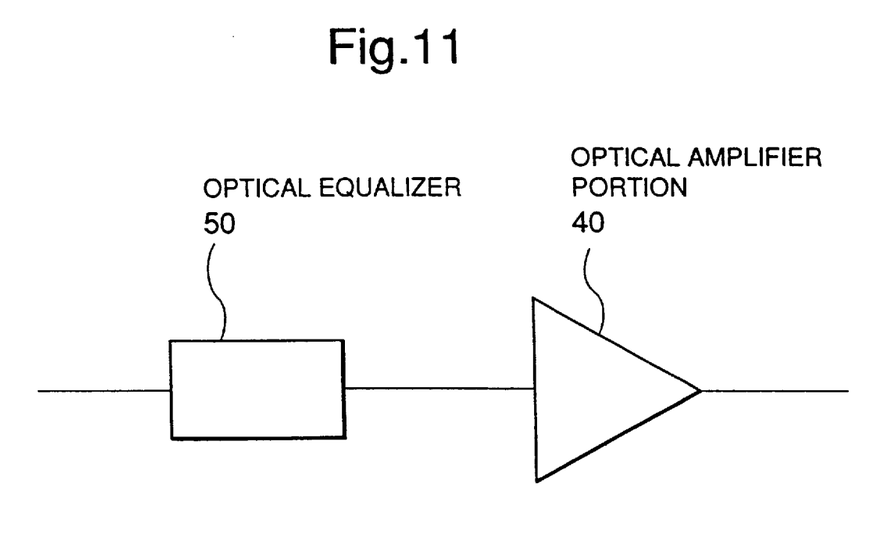
FIG. 11 is a diagram of a second embodiment of an optical amplifier applied with an optical equalizer of the present invention.

FIG. 10 and FIG. 11 show structures of embodiments when an optical equalizer according to the present invention is used in an optical amplifier.

The optical equalizer 50 shown in FIG. 2 is connected to an output terminal or an input terminal of an optical amplifier 40 composed of an optical fiber amplifier or an optical semiconductor amplifier. Even when a difference among output levels of amplified light signals of respective wavelengths is produced originating in the wavelength dependency of the gain of the optical amplifier 40, it is possible to compensate the difference in level and flatten the level when insertion losses for respective wavelengths of the optical equalizer are set in advance so as to offset the difference. The optical equalizer of the present invention having such a function may be arranged either in the foregoing part of the optical amplifier 40 or in the latter part thereof. The optical equalizer may be arranged between two optical amplifiers by using two sets of optical amplifiers 40.

Furthermore, the optical equalizer of the present invention is able to cancel not only the level difference by the wavelength dependency of the gain of the optical amplifier 40, but also the level difference among optical signals of respective wavelengths produced by an optical transmission line.

Next, a case when the optical equalizer of the present invention is applied to a wavelength multiple optical transmission system composed of a repeater having an optical amplifier will be described.

Figure 12:
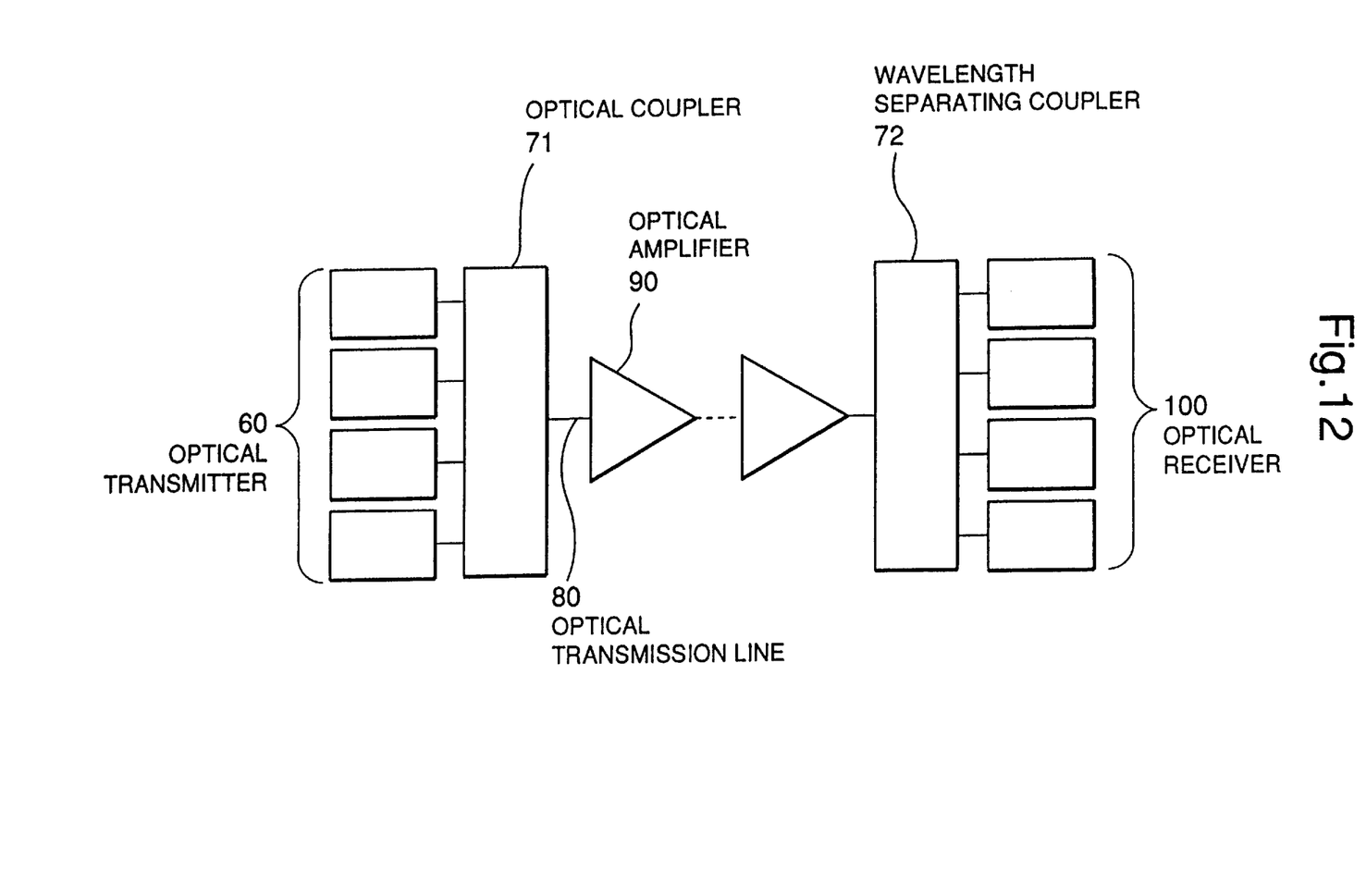
FIG. 12 is a diagram showing a structure of one embodiment of a wavelength multiple optical transmission apparatus applied with an optical amplifier provided with an optical equalizer of the present invention.

FIG. 12 shows a structure of an embodiment in case an optical amplifier including an optical equalizer according to the present invention is applied to a wavelength multiple optical transmission system. Outputs of a plurality of optical transmitters 60 having mutually different wavelengths are coupled in one line of optical fiber by means of an optical coupler 71, and outputted to an optical transmission line 80. At least one set of optical amplifier 90 is inserted into the optical transmission line 80. The optical equalizer 50 shown in FIG. 2 is used inside the optical amplifier 90. An optical coupler 72 for separating the wavelength multiple signal for each wavelength is connected to the output end of the optical transmission line 80, and the optical signals separated in the optical coupler 72 are received by a plurality of optical receivers 100.

The optical equalizer of the present invention is provided with a plurality of etalon filters arranged in concatenation, a light output portion for outputting a light to these etalon filters, and a light input portion to which the light transmitting the etalon filters is inputted, and the plurality of etalon filters have mutually different free spectrum regions. By adopting such a structure, it is possible to flatten the gain wavelength curve of an optical amplifier almost completely.

This can be comprehended from such facts that the Fourier expansion terms of the gain wavelength curve can be compensated completely by means of a plurality of filters having sinusoidal wave loss wavelength characteristics in point of principle and that the etalon filters have sinusoidal wave loss wavelength characteristics in point of principle as already described in detail.

In the optical equalizer of the present invention, the loss wavelength characteristics can be adjusted finely by adjusting an incident angle of a light upon the etalon filter at the time of manufacturing. Therefore, there is such an advantage that optical equalizers having fixed characteristics stably. This can be comprehended from a fact that the loss wavelength characteristics are a function of the incident angle θ of a light in a principle expression showing the loss wavelength characteristics of an etalon filter.

It is also possible to bring the incident angle of a light upon the etalon filter to approximately 0 degree and to reduce the polarized light dependency of the loss by manufacturing the etalon filter while selecting the optical path length thereof appropriately. This can be comprehended from a fact that the loss wavelength characteristics are a function of an optical length d in the principle expression of the loss wavelength characteristics of the etalon filter.

It becomes possible to control generation of level difference due to the difference of gain among wavelengths of optical signals and to realize stable wavelength multiple optical transmission in a wavelength multiple optical transmission apparatus by combining an optical equalizer of the present invention having such characteristics as described above and using the combination as an optical repeater.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical equalizer comprising:
   at least one etalon filter;
   light output means for outputting a plurality of optical signals having mutually different wavelengths to said at least one etalon filter; and
   light input means into which light transmitting through said at least one etalon filter is inputted.

2. An optical equalizer according to claim 1, wherein, in said optical equalizer, losses for said optical signals of respective wavelengths of said plurality of etalon filters are set so as to reduce an output difference among said plurality of optical signals.

3. An optical equalizer according to claim 2, wherein at least one of said plurality of etalon filters includes a reflecting substrate where reflecting films for reflecting a part of light are formed on two surfaces of a substrate through which the light is made to transmit, and said substrate has such a plate thickness that a loss difference among said plurality of optical signals transmitting through said at least one of said etalon filters shows a predetermined specific value.

4. An optical equalizer according to claim 3, wherein, when it is assumed that respective wavelengths of said plurality of optical signals are λi (i is an integer of 2 or more), said at least one of said plurality of etalon filters provided with an interference portion including semipermeable films having reflectances r1 and r2, respectively, that are made of a medium of a refractive index n and applied to both surfaces having a mutual surface spacing at d, and said surface spacing and said reflectances r1 and r2 of said respective interference portions are determined so that at transmittance T for said optical signals of respective wavelengths i that have passed through said respective interference portions of said at least one of said plurality of etalon filters shows a ratio predetermined among said respective optical signals.

5. An optical equalizer according to claim 4, wherein said reflecting film is a dielectric multilayer film.

6. An optical equalizer according to claim 4, wherein said reflecting film is a metallic film.

7. An optical equalizer according to claim 4, wherein said substrate is a glass substrate.

8. An optical equalizer according to claim 4, wherein said dielectric multilayer film has such a film thickness that the loss difference of said plurality of optical signals transmitting through said at least one of said plurality of etalon filters shows a predetermined specific value.

9. An optical equalizer according to claim 4, wherein said at least one of said plurality of etalon filters is arranged between a wedge-shaped first substrate having a predetermined angle and a second substrate having a wedge shape of an angle same as said predetermined angle and arranged in a reverse direction to said wedge shape of said first substrate.

10. An optical equalizer according to claim 9, wherein said at least one of said plurality of etalon filters is joined to the wedge-shaped first substrate having a predetermined angle.

11. An optical equalizer according to claim 4, wherein, in said at least one of said plurality of etalon filters, a substrate having a hole larger than a beam diameter of said optical signal is joined so that said optical signal passes through said hole.

12. An optical amplifier comprising a first optical amplifier for amplifying a plurality of optical signals having mutually different wavelengths and outputting amplified optical signals and an optical equalizer, wherein said optical equalizer includes:
   a plurality of etalon filters arranged in concatenation;
   light output means for outputting said optical signals to said etalon filter; and
   light input means to which said optical signals transmitting through said etalon filters are inputted;
   wherein said plurality of etalon filters have mutually different free spectrum regions.

13. An optical amplifier according to claim 12, wherein said plurality of etalon filters have a transmission loss which offsets a level difference among said amplified optical signals of said respective wavelengths.

14. An optical amplifier according to claim 13, wherein said optical equalizer is arranged in the latter part or in a foregoing part of said optical amplifier.

15. An optical amplifier according to claim 14, wherein said optical amplifier has a second optical amplifier for amplifying and outputting said optical signals, and said optical equalizer is arranged between said first optical amplifier and said second optical amplifier.

16. An optical amplifier according to claim 12, wherein said first optical amplifier is an optical fiber amplifier.

17. An optical amplifier according to claim 12, wherein said first optical amplifier is an optical semiconductor amplifier.

18. An optical amplifier comprising:
an optical transmission apparatus including an optical transmitter for outputting optical signals have mutually different plurality of wavelengths, and an optical coupler for synthesizing said plurality of optical signals and outputting synthesized optical signal at one end of an optical transmission line;
an optical reception apparatus including an optical branching filter for branching the synthesized optical signal outputted from another end of said optical transmission line for each of said wavelengths and sending branched optical signals, and an optical receiver connected to said optical branching filter and converting said branched optical signals into electric signals, respectively; and
at least one optical amplification repeater apparatus arranged between said optical transmission apparatus and said reception apparatus and amplifying said synthesized optical signals and outputting them to said optical transmission line; wherein:
said optical amplification repeater apparatus includes a first optical amplifier for amplifying inputted optical signals and outputting amplified optical signals, a plurality of etalon filters arranged in concatenation, a light output means for outputting a light to said etalon filters and a light input means to which a light transmitting said etalon filters is inputted; and
said plurality of etalon filters have mutually different free spectrum regions.

19. An optical amplification apparatus according to claim 18, wherein said optical equalizer is arranged in the latter part or in the foregoing part of said optical amplifier.

20. An optical amplification apparatus according to claim 18, wherein said optical amplification apparatus further includes:
a first optical amplifier for amplifying inputted optical signals and outputting amplified optical signals; and
a second optical amplifier for amplifying said amplified optical signals and outputting amplified optical signals; wherein:
said optical equalizer is arranged between said first optical amplifier and said second optical amplifier.

21. An optical amplification apparatus according to claim 18, wherein said optical amplifier is an optical fiber amplifier.

22. An optical amplification apparatus according to claim 18, wherein said optical amplifier is an optical semiconductor amplifier.

23. An optical equalizer according to claim 1, wherein said sinusoidal waveform loss characteristics are expressed by the following equation:

$$T = 1 - 2 \cdot r1 \cdot r2(1 - \cos \delta).$$

24. An optical equalizer according to claim 1, further comprising:
a plurality of etalon filters, including said at least one etalon filter, arranged in concatenation, said plurality of etalon filters having mutually different free spectrum regions.

25. An optical equalizer according to claim 24, wherein loss characteristics for said plurality of etalon filters have a sinusoidal waveform portion of a same amplitude and period as Fourier expansion terms of a gain curve of an optical amplifier, to thereby substantially flatten the gain curve of the optical amplifier when light passes through said optical amplifier and said plurality of etalon filters.

26. An optical equalizer according to claim 25, wherein said plurality of etalon filters and the optical amplifier are disposed along an optical path, and wherein said plurality of etalon filters are located at one of before the optical amplifier along said optical path and after the optical amplifier along said optical path.

27. An optical equalizer according to claim 25, wherein said sinusoidal waveform loss characteristics of said plurality of etalon filters vary with an incident angle of light on said plurality of etalon filters, so that said sinusoidal waveform loss characteristics are adjusted by adjusting the incident angle of light.

28. An optical equalizer according to claim 25, wherein the amplitude and period of said sinusoidal waveform loss characteristics are set to be same as said Fourier expansion terms by adjusting a light path length and reflectance of at least one of said plurality of etalon filters.

29. An optical equalizer according to claim 1, wherein, in said optical equalizer, losses for said optical signals of respective wavelengths of said at least one etalon filter are set so as to reduce an output difference among said plurality of optical signals.

30. An optical equalizer according to claim 29, wherein said at least one etalon filter includes a reflecting substrate where reflecting films for reflecting a part of light are formed on two surfaces of a substrate through which the light is made to transmit, and said substrate has such a plate thickness that a loss difference among said plurality of optical signals transmitting through said at least one etalon filter shows a predetermined specific value.

31. An optical equalizer according to claim 30, wherein, when it is assumed that respective wavelengths of said plurality of optical signals are λi (i is an integer of 2 or more), said at least one etalon filter is provided with an interference portion including semipermeable films having reflectances r1 and r2, respectively, that are made of a medium of a refractive index n and applied to both surfaces having a mutual surface spacing at d, and said surface spacing and said reflectances r1 and r2 of said respective interference portions are determined so that a transmittance T for said optical signals of respective wavelengths i that have passed through said respective interference portions of said at least one etalon filter shows a ratio predetermined among said respective optical signals.

32. An optical equalizer according to claim 4, wherein a wedge-shaped substrate is arranged on an incident side of said at least one of said plurality of etalon filters, said wedge-shaped substrate having an incident surface which is inclined at a predetermined angle so as to reduce losses caused by arcuation of light passing through said at least one of said plurality of etalon filters.

33. An optical equalizer according to claim 31, wherein a wedge-shaped substrate is arranged on an incident side of said at least one etalon filter, said wedge-shaped substrate having an incident surface which is inclined at a predetermined angle so as to reduce losses caused by arcuation of light passing through said at least one etalon filter.

34. An optical equalizer according to claim 32, wherein said predetermined angle permits said at least one of said plurality of etalon filters to achieve a desired effective plate thickness without realizing a corresponding deterioration of optical characteristics.

35. An optical equalizer according to claim 33, wherein said predetermined angle permits said at least one etalon filter to achieve a desired effective plate thickness without realizing a corresponding deterioration of optical characteristics.

36. An optical equalizer according to claim 31, wherein said dielectric multilayer film has such a film thickness that the loss difference of said plurality of optical signals transmitting through said at least one etalon filter shows a predetermined specific value.

37. An optical equalizer according to claim 31, wherein said at least one etalon filter is arranged between a wedge-shaped first substrate having a predetermined angle and a second substrate having a wedge shape of an angle same as said predetermined angle and arranged in a reverse direction to said wedge shape of said first substrate.

38. An optical equalizer according to claim 37, wherein at least one of said first substrate and second substrate has a coefficient of linear expansion substantially equal to said at least one etalon filter.

39. An optical equalizer according to claim 9, wherein at least one of said first substrate and second substrate has a coefficient of linear expansion substantially equal to said at least one of said plurality of etalon filters.

40. An optical equalizer according to claim 39, wherein at least one of said first substrate and second substrate has a coefficient of linear expansion substantially equal to said at least one of said plurality of etalon filters.

41. An optical equalizer comprising:

a filter;

light output means for outputting a plurality of optical signals having mutually different wavelengths to said filter;

light input means into which light transmitted through said filter is inputted;

wherein said filter includes a wedge-shaped substrate, a Fabry-Perot resonance element having same characteristics as an etalon element, and reflection films disposed on opposing surfaces of said Fabry-Perot resonance element through which light passes, wherein said wedge-shaped substrate has an incident surface inclined at a predetermined angle so as to reduce losses caused by arcuation of light passing through said filter, and wherein said predetermined angle permits said Fabry-Perot resonance element to achieve an effective plate thickness without realizing a corresponding deterioration of optical characteristics.

42. An optical equalizer according to claim 41, wherein said predetermined angle is at most approximately 2 degrees.

43. An optical equalizer, comprising:

an etalon filter;

light output means for outputting a plurality of optical signals having mutually different wavelengths to said etalon filter;

light input means into which light transmitted through said etalon filter is inputted;

wherein said etalon filter includes:

(1) an etalon element; and (2) two dielectric parallel plates are arranged on an incident side of said etalon element in such a manner as to form a donut-shaped ray transmitting portion, wherein light passes through said donut-shaped ray transmitting portion to prevent arcuation of said light when output from said etalon filter.

44. An optical equalizer according to claim 43, wherein said two dielectric parallel plates are made of a material having a coefficient of linear expansion substantially equal to that of material from which said etalon element is made.

45. An optical equalizer according to claim 43, wherein said two dielectric parallel plates are directly fixed to said etalon element with adhesives.

* * * * *